United States Patent [19]

Taguchi et al.

[11] Patent Number: 5,200,261
[45] Date of Patent: Apr. 6, 1993

[54] FOAM MATERIAL REINFORCED WITH COMPOSITE FIBERS

[75] Inventors: Setsuo Taguchi, Shiga; Miyoshi Okamoto, Osaka, both of Japan

[73] Assignee: Toray Industries, Inc., Japan

[21] Appl. No.: 624,240

[22] Filed: Dec. 7, 1990

[30] Foreign Application Priority Data

Dec. 11, 1989 [JP] Japan .................. 1-322164

[51] Int. Cl.$^5$ .............. D02G 3/00; B32B 5/22; B32B 3/26; B32B 7/00
[52] U.S. Cl. .................. 428/245; 428/288; 428/289; 428/290; 428/296; 428/304.4; 428/317.1; 428/317.7; 428/317.9; 428/373; 428/374; 428/394; 428/408; 428/902
[58] Field of Search ............ 428/373, 374, 394, 317.9, 428/304.4, 296, 288, 245, 289, 290, 317.1, 317.7, 408, 902

[56] References Cited

U.S. PATENT DOCUMENTS

| | | | |
|---|---|---|---|
| 3,932,687 | 1/1976 | Okamoto et al. | 428/288 |
| 4,163,824 | 8/1979 | Saidla | 428/317.9 |
| 4,438,166 | 3/1984 | Gluck et al. | 428/317.9 |
| 4,457,373 | 7/1984 | Matsui et al. | 428/373 |
| 4,612,241 | 9/1986 | Howard, Jr. | 428/294 |
| 4,830,904 | 5/1989 | Gessner et al. | 428/374 |
| 4,925,729 | 5/1990 | O'Connor | 428/374 |

Primary Examiner—George F. Lesmes
Assistant Examiner—James D. Withers
Attorney, Agent, or Firm—Austin R. Miller

[57] ABSTRACT

A fiber-reinforced foamed material comprises a foamed body of a resin having a flexural elasticity modulus not smaller than 150 kg/mm$^2$, reinforcement fibers, and a bonding component through which the reinforcement fibers are integrated with the foamed body so as to reinforce the foamed body.

A method for producing a fiber-reinforced foamed material comprises the steps of: providing a material having a potential foamability; providing a composite fibrous material in the form of composite fibers and/or composite yarns each having a first component and a second component; and allowing the foamable material to foam together with the composite fibers or composite yarns at a temperature 10° C. or more higher than the thermal deformation temperature or melting temperature of the first component and 20° C. or more lower than the thermal deformation temperature or melting temperature of the second component, whereby the first component is thermally deformed or melted to serve as a bonding component, while the second component remains as a fibrous reinforcement component, the fibrous reinforcement component being integrated with the foamed body through the bonding component so as to reinforce the foamed body.

21 Claims, 2 Drawing Sheets

FOAM MATERIAL REINFORCED WITH COMPOSITE FIBERS

BACKGROUND OF THE INVENTION

1. Field of the Invention

The present invention relates to a fiber-reinforced foamed material and a method of producing it. More particularly, the present invention relates to a fiber-reinforced foamed material which exhibits high resistance both to impact and flexing, as well as excellent shape maintaining characteristics and which is produced by allowing a foamable material capable of forming a highly rigid foamed body to foam together with specific composite fibers and/or specific composite yarns as reinforcers.

Hitherto, foamed materials such as those of polystyrene and phenol resin, which generally exhibit small distortion against external force and, hence, superior shape maintaining characteristics and dimensional stability, have been widely used as packaging materials for packaging various household electric appliances and precision instruments, materials of cooler boxes and heat-insulating architectural materials.

These known foamed materials, on the other hand, generally exhibit small resistance to stresses caused by application of an impact, bending or flexing. Thus, these foamed materials are liable to be cracked or bent even by a slight deformation, often resulting in destruction of the structures made from such foamed materials. For these reasons, the known foamed materials have been considered as being unsuitable for use as materials which are expected to undergo strong impact or deforming forces caused by bending or torsion. Thus, the known foamed materials have a limited use despite the above-mentioned advantages.

For instance, foamed polystyrene, which is widely used for packaging household electric appliances cannot be used alone since the packaging material tends to be broken by an impact to allow damaging of the contents or to generate dust or fractions of the foamed material during transportation. In order to obviate such problems, it has been a common measure to use another material such as a corrugated board together with the foamed material such that the formed material is coated and reinforced by the other material, or to increase the thickness of the foamed material. All these countermeasures require laborious steps in the production process and raise costs for transportation and storage due to an increase in the size and weight.

It has also been proposed to use a composite material in which a polystyrene foamed material is reinforced with another plastics material. Such a composite material, however, is generally too hard, heavy and expensive and, hence, is not preferred.

Methods have also been proposed in which a foamed material is reinforced with fibers mixed therein, as disclosed, for example, in JP-C-47-28097 and JP-A-48100471.These methods, however, cannot provide a substantial reinforcement effect because of insufficient affinity or integration between the reinforcement fibers and the foamed material. Thus, these methods also are still unsatisfactory.

Referring now to foamed materials of a phenol resin, attempts have been made to apply this type of material to architectural materials, since this type of material exhibits high resistances to heat and fire, in addition to the excellent shape maintaining characteristics and dimensional stability mentioned before. Foamed materials of phenol resins, however, are generally fragile and easily collapsible, which makes this type of material difficult to work and finish. In order to overcome this problem, measures have been taken such as laminating paper sheets on obverse and reverse sides of the foamed material or using a honeycomb structure with cells in which the resin foams. Such measures also are laborious and expensive. In addition, dropping of edges and fracturing into powder are liable to occur with this type of material during nail driving and cutting at construction sites. Thus, the aforesaid problems still remain unsolved.

Thus, attempts have been made to improve mechanical performance or shape maintaining characteristics, as well as dimensional stability, by strengthening the foamed material with fibers. Unfortunately, however, these attempts could not provide a satisfactory reinforcement effect due to insufficient integration between the foamed material and the fibers after the foaming. This is attributable to the fact that the temperature at which the fibers can be thermally deformed or become molten is generally much higher than the temperature at which the resin is allowed to foam. It would be possible to use a fiber which is thermally deformed or molten at a temperature below the foaming temperature. Such a fiber, however, cannot make any contribution to the reinforcement because the fiber itself can no longer have strength after the foaming.

Low-rigidity polymers such as polyethylene and polypropylene exhibit high resistances to bending and torsion by virtue of their excellent stretchability. A composite material having improved strength and dimensional stability would be obtainable by reinforcing such low-rigidity polymer with fibers. The low rigidity of the foamed material, however, allows an easy deformation of the foamed material. In such a composite material, the foamed resin is first deformed to leave stresses which are borne by the fibers. Such a composite material, therefore, cannot exhibit superior shape maintaining characteristics and dimensional stability, and no appreciable reinforcement effect is produced.

The behaviour of this type of material under a flexural stress will be described by way of example. When a bending force is applied to a material, tensile stress is generated in one side while compression stress is produced in the other side. A foamed material under a flexural stress, when the rigidity is low, is first buckled at the compressed side. Thus, the reinforcement effect of the fibers is developed only after such a buckling. It will be seen that the fibers cannot make any contribution.

SUMMARY OF THE INVENTION

It is an object of the invention to provide a fiber-reinforced foamed material in which the fibers impart superior mechanical properties and excellent shape maintaining characteristics.

It is another object of the invention to provide such a material without necessarily including additional materials for providing a unitary fiber-reinforced foamed material.

To this end, according to one aspect of the present invention, there is provided a fiber-reinforced foamed material comprising (1) a foamed body of a resin having a flexural elasticity modulus not smaller than 150 kg/mm$^2$, (2) reinforcement fibers, and (3) a bonding component through which the reinforcement fibers are integrated with the foamed body so as to reinforce the foamed body.

According to another aspect of the present invention, there is provided a method of the invention for producing a fiber-reinforced foamed material comprising the steps of: providing a material having a potential foamability; providing a composite fibrous material in the form of composite fibers and/or composite yarns each having a first component and a second component; and allowing the foamable material to foam together with the composite fibers or composite yarns at a temperature at least about 10° C. higher than the thermal deformation temperature or melting temperature of the first component and at least about 20° C. lower than the thermal deformation temperature or melting temperature of the second component; whereby the first component is thermally deformed or melted to serve as a bonding component, while the second component remains as a fibrous reinforcement component, the fibrous reinforcement component being integrated with the foamed body through the bonding component so as to reinforce the foamed body.

The method set forth above utilizes the reinforcers in the form of composite fibers and/or composite yarns which composite yarns may comprise different respective fibers, some providing the first and some providing the second component, or may comprise composite fibers.

The fibers or yarns may be randomly distributed within the foamed resin matrix, or may be aligned with one another. However, at least some of the reinforcement fibers may be provided by a composite fibrous material is the form of a cloth formed from such composite fibers or yarns. The composite fibers and/or composite yarns may be disposed on the surface of the foamed body and/or inside the foamed body, so as to reinforce it.

Preferably a fabric is provided at least at the surface of the fiber reinforced foamed material. The fabric may be, for example, a double knit construction in which the inner layer is knitted from the abovementioned composite fibers or yarns so as to provide a strong bonding with the foamed body while the outer layer is knitted from fibers (not necessarily composite fibers as described above) and with a construction such that the outer layer provides the reinforced foam material with the desired properties, for example, waterproofing, decoration etc.

Alternatively, the surface may be of a non-woven material, in which case, the outer surface of the fiber reinforced foamed material may be shaped by pressing against a wire net, for example by placing the wire net around the internal periphery of a mould, placing the non-woven fabric on the net and then allowing the foamed material to expand within the mould.

By the use of the composite fibrous material described above, it is possible to provide fiber-reinforced foam materials embodying the invention in which the fiber reinforcement can impart superior mechanical properties and excellent shape maintaining characteristics to the foamed material without necessarily including other materials for improving bonding (though in fact, the material may still be particularly compatible with certain conventional adhesives where, for example, the fiber-reinforced foamed material is to be adhered to another material in a laminate structure).

Thus, we find that fiber-reinforced foamed materials embodying the invention are useful in fields in which impacts and other dynamic forces which could never be sustained by known materials are expected to be applied, such as architectural and civil engineering materials, e.g., soil retainers and other civil engineering materials, building materials in general, partitions (for example in offices), furniture, waterproof protecting plates, heat-insulating materials, especially for use in refrigerators and air conditioners, automotive interior materials, packaging materials, and sports and general merchandise goods.

It is possible to obtain extremely lightweight materials which are especially economical to manufacture and which can serve as an excellent replacement for wood in many of the above uses.

The fiber-reinforced foamed material according to the present invention exhibits a very high strength which widens the use of this material. For instance, the fiber-reinforced foamed member of the present invention can be used as the materials of various off-shore facilities such as airports, pontoon bridges, tennis courts, golf links and playgrounds.

Where, as mentioned above, at least some of the reinforcing fibers are used in the form of a cloth comprising the composite fibers and/or yarns, it is possible to effect a suitable decorative treatment on the surface of the foamed material. It is therefore possible to obtain products which are superior in all the aspects of appearance, mechanical properties and waterproofing which could never be met simultaneously by known materials. Indeed, since the material may be provided with a highly waterproof surface they may find particular use as linings for refrigerators and air conditioners and as swimming aids, for example safety rings to be worn or grasped by a swimmer.

A packaging material made of a fiber-reinforced foamed material of the present invention can be used directly for transportation of goods without any risk of damaging these goods and without the aid of any additional material such as corrugated board sheets. The elimination of other materials reduces the production cost. Transportation and storage costs also are reduced thanks to reduction in the size.

From the above, it can be seen that we have succeeded in minimizing or overcoming the problems of conventional foamed, fiber-reinforced materials, i.e., insufficiency of the reinforcement effect produced by the fibers, by reinforcing a foamed material of a high-rigidity polymer with specific composite fibers or a cloth of the specific composite fibers.

Typically, a method embodying the present invention can be carried out by mixing, in a specific high-rigidity polymer, a specific composite fiber and/or a cloth of such a composite fiber (referred to collectively as a composite fiber/cloth), with at least one component thereof being sufficiently drawn in the fiber axis direction so as to develop a high fiber strength, while at least one other component is sufficiently thermally deformable or meltable at the foaming temperature.

When a mixture of such foamable material and specific composite fiber/cloth is subjected to a foaming treatment, at least one component of the composite fiber/cloth is thermally deformed or becomes molten so as to serve as a bond so that the composite fiber/cloth is integrally bonded to the foamed material by the energy produced during foaming. Meanwhile, at least one component of the composite fiber/cloth keeps the fibrous form so that any externally applied stress is shared by the foamed material and the composite fiber/cloth Using a method embodying the present invention it is possible to provide a fiber-reinforced foamed material having remarkably improved tensile strength, impact strength, flexural strength and torsional strength, while maintaining excellent shape maintaining characteristics and dimensional stability, by virtue of the above-described reinforcing mechanism.

BRIEF DESCRIPTION OF THE DRAWINGS

The invention will now be described in more detail with reference to the accompanying drawings in which.

DESCRIPTION OF THE PREFERRED EMBODIMENTS

The fiber-reinforced foamed material of the present invention comprises, mainly, preferably at least two portions: namely, the foamed body and composite fibers which contribute to reinforcement. The composite fiber also has two portions: namely, a thermally-deformable or meltable portion (referred to hereinafter as a "first component") which exhibits a semi-fibrous or non-fibrous state after the foaming treatment and a fibrous portion (referred to hereinafter as a "second component") which remains in the fibrous state after the foaming treatment so as to contribute to the reinforcement.

The ratio between the foamed portion (P) and the composite fiber portion (F) is not limited. However, we have found that good results can be obtained when the ratio P/F in terms of weight ratio ranges between 99/1 and 30/70.

To achieve the objects of the invention, i.e., to attain high mechanical properties and shape maintaining characteristics without impairing shape maintaining characteristic and dimensional stability, a polymer having a high rigidity is used as the foamable resin. More specifically, the polymer suitably used has a flexural elasticity modulus which is at least about 150 kg/mm$^2$, more preferably at least 200 kg/mm$^2$. Thus, advantages of the present invention are not accomplished with low-rigidity polymers whose flexural elasticity modulus values are below 150 kg/mm$^2$. In this specification, therefore, polymers having flexural rigidity of 150 kg/mm$^2$ or higher will be referred to as high-rigidity polymers, while polymers of flexural elasticity modulus values below 150 kg/mm$^2$ will be referred to as low-rigidity polymers. The values of the flexural elasticity modulus shown in this specification are those measured by a method specified in ASTM-D790.

Preferred examples of such high-rigidity polymers are polymers having at least one benzene ring in monomer units thereof, for example polystyrene resin and phenol, especially phenol formalin, resins. Other examples of the high-rigidity polymers are thermoplastics or thermosetting foamable resins containing, one, two or more of styrene-ethylene copolymers, acrylonitrile-styrene copolymers, acrylonitrile-butadiene-styrene (ABS) resins and phenol/urea formaline co-condensation resins.

The reason why a polymer having a benzene ring is preferably used in this invention is that this type of polymer generally exhibits high rigidity even in an amorphous or non-crystalline state and that the foamed product exhibits high shape maintaining characteristics and dimensional stability. The high rigidity of the foamed material enables the tensile or compression stress to be borne simultaneously by the foamed material and the fibers, thus ensuring a high reinforcing effect.

Preferably, the second component of the composite fiber, which remains fibrous even after the foaming treatment, has been subjected to a drawing in the fiber axis direction at a sufficiently large drawing ratio to develop a high degree of orientation and strength. It is also preferred that this material exhibits an extremely small degradation in strength against heat applied during the foaming. More specifically, the second component alone should have a fiber strength which is at least about 2 g/d (about 2.2 dtex), more preferably at least 3 g/d (about 3.3 dtex). It is also preferred that the second component has a melting point which is not lower than 125° C. More preferably, high-melt point polymers of 160° C. or higher, especially 200° C. or higher are used as the second component. Various spinnable polymers can suitably be used as the second component. Examples of such polymers are polyesters represented by polyethylene terephthalate and polyamides represented by nylon 6 and nylon 66, polyallylate, polypropylene, high density polypropylene, copolymeric denaturated compounds of these polymers and mixtures of these polymers with other compounds. One, two or more of the polymers mentioned above are selectively used in accordance with conditions such as the combination of the foamable material and the first component, foaming treatment temperature, use of the fiber-reinforced foamed material and so forth.

On the other hand, the first component serves as a bonding component which ensures integration between the foamed material and the fibers. To this end, the first component must be thermally deformed or made molten by the application of heat during foaming. It is also preferred that the first component exhibits high bondability and compatibility with the foamed material. This may be achieved by using, as the first component, a copolymer containing a monomer unit present in the foamed material.

However, polymers which do not have the same monomer unit as the foamed material can well achieve desired advantages of the invention provided that they can develop a large frictional force or anchoring effect between these polymers and the foamed material due to thermal deformation or melting so as to prevent dropping or slip of the fibers.

Preferably, the selection of the first and second components is conducted in a manner such as to meet the following conditions.

(1) (MD of first component+10° C.)<foaming treatment temp.

(2) (foaming treatment temp.+50° C.)<MD of second component (3) (MD of first component+70° C.)<MD of second component (4) (MD of foamed material+50° C.)<MD of second component In this specification, regarding the first component and the foamed material, the glass transition temperature as measured in accordance with ASTM-D3418 is recited as MD, and regarding the second component, MD means the melting point temperature as measured by the method specified in ASTM-D3418.

As will be seen from the conditions (1) to (4) shown above, the temperature difference between the first component MD and the foaming treatment temperature is preferably at least 10° C., more preferably 20° C. or greater, in order that a sufficient bonding effect is developed by thermal deformation or melting of the first component as a result of the foaming treatment. It is also preferred that the temperature difference between the MD of the second component and the foaming treatment temperature is 20° C. or greater, more preferably 50° C. or greater, especially 80° C. or greater, in order to minimize reduction of the degree of orientation of the second component, i.e, any reduction in the strength, caused by the heat applied during the foaming treatment. For the same reasons, the MD of the second component is preferably at least 70° C., more preferably at least 90° C., greater than the MD of the first component. The MD of the second component is preferably at least 50° C., more preferably at least 70° C., greater than the MD of the foamed material.

In order to obtain simultaneously both good formability of the foamed material and strong bonding power of the first component, it is preferred that the first component has a thermal deformation temperature or melting point which is at least 10° C. lower than the MD of the foamed material.

It is important that the combination of the polymers of the first and second components is determined to enhance the reinforcing effect by minimizing any reduction in the strength of the second component. This requires that the polymers of the first and second components are selected to maximize the difference in the thermal deformation temperature or the melting point between both components. The polymers of both components may be of the same component system or of different systems.

Thus, various polymers are selectable as the first and second components provided that the above-mentioned conditions are met.

When the first component is a polymer which contains the same monomer unit as the foamed material, two methods are available for lowering the MD of the first component down below the foaming treatment temperature: namely, a so-called internal plasticizing method in which a component capable of reducing the MD is formed by copolymerization and a so-called external plasticizing method in which a plasticizer is mixed with the first component.

The internal plasticizing method will be described with reference to the case where the foamed member is a styrene type polymer. A copolymer which reduces the MD of the first component is obtained by copolymerizing the styrene type polymer with high-grade alcohol ester of acrylic acid and/or methacrylic acid. Examples of the styrene type polymer are polystyrene, styrene-ethylene copolymer and/or acrylonitrile-styrene copolymer. The alcohol component of the thus-obtained copolymer preferably has from 2 to 20, preferably 4 to 16, carbon atoms inclusively, considering the effect of reducing the MD and ease of fiber spinning. It is also preferred that the alcohol component has a side chain. The amount of (meth)acrylate by weight of the total weight of the copolymer of (meth)acrylate and styrene type polymer is from 5 to 50 wt %, more preferably 10 to 30 wt % inclusive.

The external plasticizing method will also be explained with reference to a case where the foamed member is a styrene type polymer. Examples of plasticizer suitably used are arylenemethyl oligomer, butene oligomer, saturated high grade fatty acid ester, dibutylphthalate, diamylphthalate, dioctylphthalate, styrene oligomer, triphenylphosphate, tricresylphosphate, phenylstearylalcohol, diisoamylnaphthalene, trioctylbutanecarboxylate, methlydibutylbutanetricarboxylate,, triallylbutanetricarboxylate, and liquid paraffin. It is also possible to use 4,4'-dialkyldiphenylparaffins, 4-alkyldiphenylethanes, 4-n-butylphenylparaffins and ω,ω'-diphenylparaffins. One, two or more of the above-mentioned plasticizers are selectively used according to the purpose of use of the product. Considering the effects such as bondability to the foamed material and reduction in the MD, as well as ease of spinning of composite fibers, the amount of plasticizer to be added preferably ranges between 5 and 50 wt %, more preferably between 10 and 30 wt %, inclusively, with respect to the polymer.

Needless to say, the invention does not exclude simultaneous use of the internal and external plasticizing methods.

As to the case where the polymer does not have the same monomer unit as the foamed material, we have found that a remarkable reinforcement effect by fibers can be obtained by using, when the fiber-reinforced foamed material comprises polystyrene (optimum foaming treatment temperature 110° C.), a polyester thermally deformable at low temperature (acid component: terephthalic acid/isophthalic acid=60/40 (mol ratio), glycol component: ethylene glycol, thermal deformation temperature: 75° C.) as the first component and polyethylene terephthalate (melting point: 265° C.) as the second component. A combination of a phenol resin (novolak type: optimum foaming treatment temperature 150° C.) as the foamed material, polyethylene as the first component and polyethylene terephthalate as the second component, as well as a combination of a phenol resin (resol type: optimum foaming treatment temperature 90° C.) as the foamed material, a polystyrene copolymer as the first component and nylon 66 as the second component, can also be used suitably. These combinations remarkably improve the form maintaining characteristics of the product.

Various types of composite fibrous material are usable in methods embodying the invention, such as core/sheath type, bimetal type, multi-layer bonding type and radial multi-layered type composite fibrous structures, and composite fibers of these types are especially preferred. Among these type of composite fibers, a multi-core/sheath type composite fiber, having a multiplicity of core components in a sheath component, is used most preferably because this type of fiber exhibits a greater tendency to integrate with the foamed material due to presence of bonding components among the multiplicity of cores.

Figure 1:
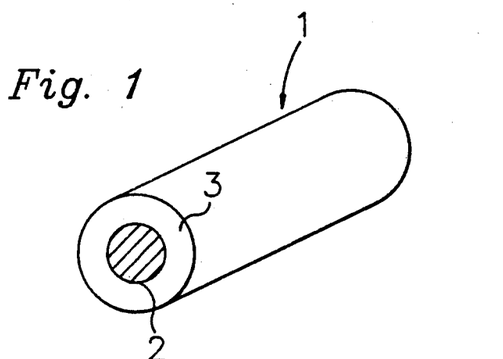
FIGS. 1 to 7 are schematic cross-sectional views of models of the composite fibers which can be used in a fiber-reinforced foamed material embodying the present invention. As will be explained later, the composite fibers 1 have core components 2, 2' and sheath components 3.

Preferably, the first component of the composite fiber is arranged on the outer periphery or in the outer shell of the composite fiber. For instance, the first component is disposed in the sheath component in the cases of core/sheath type fibers shown in FIGS. 1, 2 and 3. In composite fibers of bimetal type or multi-layer bonding type as shown in FIGS. 4, 5, 6 and 7, the first component may be disposed in either region, although it is preferably disposed in a portion where it has a large area exposed to the outside of the composite fiber.

There is no restriction in the size of the composite fiber, provided that the fiber can provide the required reinforcement effect. In general, the diameter of the composite fiber preferably ranges from 0.1 to 1000 deniers inclusive (0.11 to 1100 dtex). In the case of multi-core/sheath type fibers, the diameter of the core, fiber preferably ranges between ⅓ and 1/1000 the diameter of the composite fiber. The number of cores in such a composite fiber preferably ranges from 3 to 10000 inclusive, more preferably from 10 to 1000 inclusive.

Figure 2:
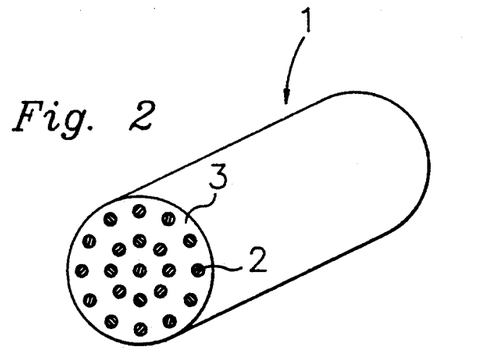
Figure 3:
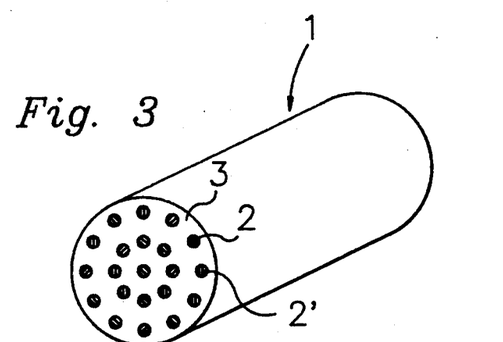
Figure 4:
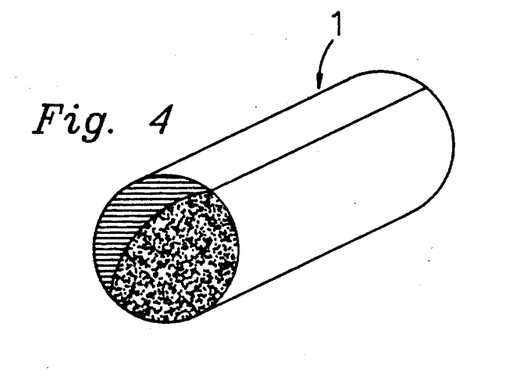
Figure 5:
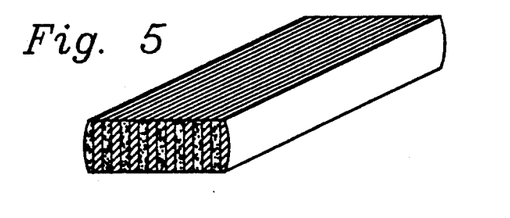
Figure 6:
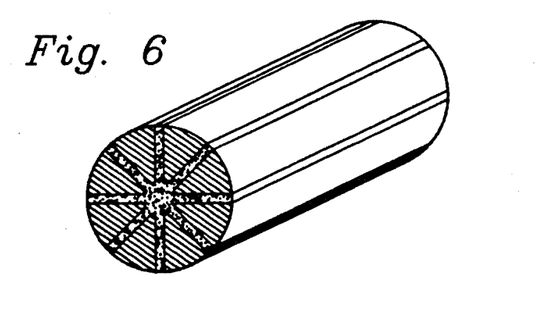
Figure 7:
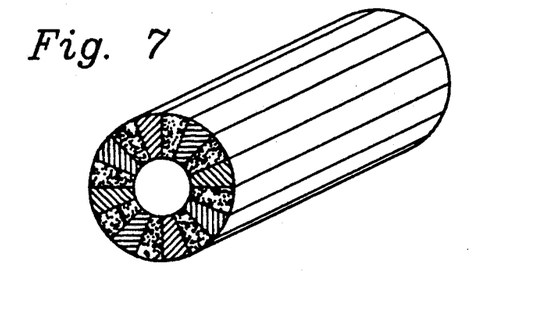

FIGS. 2 and 3 show multi-core/sheath type composite fibers. In FIGS. 2 and 3, numerals 2 and 2' denote core components, while 3 designates a sheath component. Multi-core/sheath type composite fibers can produce an appreciable effect even when they have a multiplicity of core elements of the same type, though two or more types of core elements 2 and 2' are preferably used.

Various combinations of first type of core elements/second type of core elements/sheath elements are usable when a styrene type polymer is used as the foamed mate rial. For instance, a combination of nylon/polyethylene terephthalate/styrene-2-ethylhexylacrylate copolymer, a combination of nylon 6/polybutylene/terephthalate/styrene-2-ethylhexylacrylate copolymer, and a combination of nylon 6/polyallylate/styrene-stearylacrylate can be used according to the purpose or use. There is no limitation as to the numbers of the core elements of the first and second types, nor in the composition ratios. The core elements of the first and second types can have equal or different sizes. It is also possible to use different sizes of core elements in each type.

Although a composite fiber obtained by composite spinning has been specifically mentioned, it is possible to use mix-filament yarns or double and twist yarns formed from polymers which are mentioned before as materials of the core elements, sheath component or fibrous components. For instance, the reinforcer used in a material embodying the present invention may be a composite yarn formed from fibers or yarns of the first component material and fibers or yarns of the second component material.

It is not essential that the reinforcer be in the form of loose fibers or in the form of yarns. Thus, in a fiber-reinforced foamed material embodying the present invention, at least a part of the reinforcement may be provided by a cloth formed from the above-mentioned composite fibers and/or composite yarns arranged on the outer surface of, and/or inside, the foamed portion. In such a case, the foamed portion (P) and the cloth portion (H) may be laminated in various forms, such as P/H/P, H/P/H, P/H/P/H or P/H/P/H/P. In this laminate structure, when the cloth is disposed on one surface of the foamed material, the first component may provide a film or a plastics layer so as to provide a surface having a particular desired nature such as a smooth surface, decorative surface with patternized convexity and concavity and even a surface which permits clear printing of characters or patterns, unlike the conventional foamed material in which beads of the foam are exposed to provide a rough surface. The film or the plastics layer provided by the first component also offers a remarkable improvement in the waterproofing and resistance to wetness.

Obviously, the fiber-reinforced foam material of the present invention can simultaneously employ both fibers or yarns and the cloth as reinforcers. The simultaneous use of the fibers or yarns and the cloth is preferred because such a combination provides a remarkable reinforcement effect. In such a case the cloth as a reinforcer can have various forms such as a woven cloth, a knitted fabric, a non-woven cloth or a network-like cloth. It is also possible to use a composite cloth formed from two or more of these cloths, as well as a combination of these cloths.

When the reinforcer is used in the form of fibers or yarns, a multiplicity of such fibers or yarns may be dispersed in the foamed material. In contrast, when the reinforcer is used in the form of a cloth, one or more cloths in the form of sheets are present inside and/or on one or both surfaces of the foamed material. When fibers or yarns and cloths are used simultaneously as the reinforcers, the fiber-reinforced foamed material of the invention has as construction which is a combination of the above-described two types of structures.

The composite fiber used in a material in accordance with the present invention may be a long fiber (filament), a short fiber (staple) or a very short fiber (whisker). Which one of the filament, staple and whisker is used in the fiber-reinforced foamed material of the present invention may be a matter of great significance because the performance of the fiber-reinforced foamed material, in particular the strength as well as appearance and the production process, largely vary according to the type of the fiber.

The invention does not pose any restriction in the process for producing the fiber-reinforced foamed material and any suitable process can be employed. A preferred example of the production process is as follows.

Polystyrene granules or beads, prepared for example by suspension polymerisation (such beads are commercially available) are used as the foamable material, while, multi-core/sheath type composite fibers, composed of core components of polyethylene terephthalate and a sheath component of styrene-acrylic acid ester copolymer, are used as the composite fibers. As the first step, steam is blown at the foamable polystyrene beads so as to cause a primary foaming. Then, the primarily foamed beads and the multi-core/sheath composite fibers are injected from different nozzles into a mold so as to be mixed in the mold. Subsequently, steam is blown into the mold so as to cause a secondary foaming while allowing the sheath component of the composite fibers which is deformable at low temperature to be thermally deformed thereby integrating the sheath component with the foamed material, whereby a fiber-reinforced foamed material embodying the invention is obtained.

Alternatively, or additionally, to the fibres reinforcement within the foamed body, a fabric layer may be provided on one or more surfaces of the fiber reinforced material by placing a layer or layers of fabric within the mould and blowing the beads and any further reinforcing fibers into the remaining space. Typically, opposite faces of the mould are covered with the fabric and the beads (and any further reinforcement) are blown into the space between the fabrics.

Another preferred process employs a foamable phenol resin (novolak type) as the foamed material and, as the fiber component, multi-core/sheath composite fibers composed of cores of polyethylene terephthalate and a sheath component of styrene-acrylic acid ester copolymer. The fibers are cut into short pieces and are mixed with the phenol resin by a mixer. The mixture is charged into a forming mold in which it is then pressed and heated so as to allow it to foam, whereby a fiber-reinforced foamed material embodying the present invention is obtained. Again, fabric surface layers may be provided in a manner similar to that described above.

The invention will be more fully understood from the following description of Examples. In the following description, the mixing ratios are shown in terms of weight ratio.

EXAMPLE 1

(Best Method).

Commercially available foamable polystyrene beads (flexural rigidity in non-foamed state: 280 kg/mm$^2$) were used as the foamable material. As the reinforcement fibers, polymeric oriented type filaments (36 core elements contained in each filament, single fiber size: 4.0 denier i.e. 4.4 dtex) each composed of a sheath component and a core component was used. The sheath component was made of 80 wt parts styrene-20 wt parts 2-ethylhexylacrylate (thermal deformation temperature: 57.6° C.). The core component was made of polyethylene terephthalate (melting point: 261° C.). The polymeric oriented type filaments were cut into pieces of 51 mm long.

As the first step, steam was blown at the foamable polystyrene beads so as to effect primary foaming. The primarily foamed beads and the cut pieces of the above-mentioned polymeric oriented type filaments emerged as respective jets from different ejectors into a forming mold opened at one side and exhibiting a substantially U-shaped cross-section, so as to fill the cavity in the mold. Subsequently, steam was blown into the forming mold so as to allow secondary foaming of the primarily foamed beads (foaming treatment temperature: 105° C.), while integrating the foamed material and the polymeric oriented type filaments, whereby a fiber-reinforced foamed material of the invention was obtained.

In the thus-obtained fiber-reinforced foamed material, the sheath component of the reinforcement fiber was efficiently changed into a bonding component so as to provide a high degree of integration between the foamed material and the reinforcement fibers. In addition, this fiber-reinforced foamed material exhibited superior resistances to impact, bending and torsion, as well as reduced tendency to crack. Containers for radio cassettes (radio unit with cassette tape player) were produced by using a pair of pieces of fiber-reinforced foamed material having a U-shaped cross-section, without using a corrugated board box. The containers were subjected to a transportation test with the radio cassette units encased therein. No damaging of the radio cassette units were found after the transportation.

For the purpose of comparison, fiber-reinforced foamed material was produced under the same conditions as Example 1 except that ordinary polyethylene terephthalate fibers (melting point: 261° C., single filament size: 4.0 denier (4.4 dtex), cut length: 51 mm) were used as the reinforcer, and containers produced from this foamed material were subjected to the same test as Example 1. After the test transportation, some of the radio cassette units showed peeling of the paint at corners of these units, as well as partial damaging of the units. The fiber-reinforced foamed material of this comparative Example showed insufficient integration between the foamed material and the polyethylene terephthalate fibers.

EXAMPLE 2

A foamable powder of a novolak type phenol resin (flexural elasticity modulus: 350 kg/mm$^2$) was used as the foamable material in combination with a reinforcement fiber which was a polymeric oriented type filament (36 core elements contained in each filament, single filament size 3.8 denier (4.2 dtex), cut length 10 mm) each composed of a core component of polyethylene terephthalate (melting point: 261° C.) and a sheath component of polystyrene (thermal deformation temperature: 84.4° C.). The foamable material and the cut pieces of reinforcement fiber were mixed by a mixer at such a ratio that the fiber content occupies 10 wt % of the mixture, and the mixture was charged into a forming mold. Heat and pressure were then applied to the forming mold by a heat press so as to allow the foamable material to form for 30 minutes at 140° C., whereby a fiber-reinforced foamed material was obtained.

The thus-obtained fiber-reinforced foamed material showed remarkably improved form maintaining characteristics as compared with a conventional phenol type foamed material, and could be used conveniently as a heat-insulating architectural material without the assistance of any cardboard or honeycomb structure.

EXAMPLE 3

A polymeric oriented type filament (16 core elements contained in each filament: single filament size: 3.8 denier i.e. 4.2 dtex) was cut into pieces of 10 mm length. The polymeric oriented type filament had a core component of polyethylene terephthalate (melting point: 261° C.) and a sheath component made of 80 wt % styrene-20 wt % 2-ethylhexylacrylate copolymer (thermal deformation temperature: 57.6° C.). The cut pieces of filaments emerged as a jet from an ejector into a forming mold having a U-shaped cross-section while air in the mold was removed by suction so that a layer of the polymeric oriented type fiber was formed on the inner surface of the mold. Then, commercially available polystyrene beads (flexural elastic modulus in non-foamed state: 280 kg/mm$^2$) were heated for primary foaming, and the thus-obtained primarily foamed polystyrene beads were charged together with the polymeric oriented fibers into a forming mold. The charging was stopped when the cavity in the mold was completely filled, and the mold was closed. The mold was then heated by steam at 105° C. so as to thermally deform the sheath component of the polymeric oriented fibers, while allowing secondary foaming of the primarily foamed beads.

Consequently, a fiber-reinforced foamed material was obtained in which a plastics sheet of polymeric oriented fibers with a thermally deformed sheath component was strongly bonded to the foamed material. The thus-obtained fiber-reinforced foamed material therefore exhibited high surface smoothness, and had high resistances to impact, bending and torsion, as well as reduced cracking tendency.

Containers for radio cassette units were formed from this fiber-reinforced foamed material and were subjected to a test transportation without being packaged in corrugated board boxes. The radio cassette units could be safely transported without any damage.

The name of the contents and patterns were printed on the surface of this fiber-reinforced foamed material. The printing was conducted with a high degree of clearness which could never be obtained when conventional polystyrene foamed materials were used.

EXAMPLE 4

A sheet of cloth was woven from polymeric oriented type filaments (36 core elements contained in each filament, single filament size: 3.5 denier i.e. 3.9 dtex) each composed of a core component made of nylon 66 (melting point: 261° C.) and a sheath component made of styrene-2-ethylhexylacrylate copolymer (thermal deformation temperature: 57.6° C.). The cloth sheet was placed on an inner surface of a forming mold.

The mold cavity was then charged with primarily foamed foamable beads of polystyrene (flexural elastic modulus in non-foamed state: 280 kg/mm$^2$) and the beads were heated by steam so as to foam.

In consequence, a fiber-reinforced foamed material was obtained with the surfaces covered by a cloth layer of the polymeric oriented type filaments composed of the sheath component changed into a plastics layer and the core component, the cloth layer being strongly bonded to and united with the foamed material while possessing a woven structure. The thus-obtained fiber-reinforced foamed material showed high degree of surface smoothness, and exhibited high resistances to impact, bending and torsion, as well as reduced cracking tendency. Compact containers for frozen goods were formed from this material. These containers exhibited excellent cold-preservation effect, as well as excellent appearance and durability.

EXAMPLE 5

A sheet of cloth was woven from polymeric oriented type filaments (36 core elements contained in each filament, single filament size: 3.5 denier i.e. 3.9 dtex) each composed of a core component made of polyethylene terephthalate (melting point: 261° C.) and a sheath component made of a low-melting point polyester (thermal deformation temperature: 75° C.). The cloth sheet was placed on an inner surface of a forming mold.

The mold cavity was then charged with primarily foamed foamable beads of polystyrene (flexural elastic modulus in non-foamed state: 280 kg/mm$^2$) and the beads were heated by steam so a to foam.

In consequence, a fiber-reinforced foamed material was obtained with the surfaces covered by a cloth layer of the polymeric oriented type filaments composed of the sheath component changed into a plastics layer and the core component, the cloth layer being strongly bonded to and united with the foamed material while maintaining a woven structure. The thus-obtained fiber-reinforced foamed material showed high degree of surface smoothness, and exhibited high resistances to impact, bending and torsion, as well as reduced cracking tendency.

We claim:

1. A fiber-reinforced foamed material comprising (1) a foamed body of a resin polymer, which resin polymer has a flexural elasticity modulus not smaller than 150 kg/mm$^2$, and (2) composite reinforcement fibers, said composite reinforcement fibers having a bonding component having a melting point temperature at least 10 C. lower than a foam treatment temperature and a reinforcement component having a melting point temperature 20 C. or higher than the foam treatment temperature and wherein said composite reinforcement fibers are integrated with said foamed body so as to reinforce said foamed body.

2. A fiber-reinforced foamed material according to claim 1, wherein at least some of the said composite reinforcement fibers are provided by a composite fibrous material in a form selected from the group consisting of composite fibers, composite yarns, Yarn of composite fibers and mixtures thereof, said composite fibrous material having a first component which has been thermally deformed or melted by heat applied during the foaming so as to serve as said bonding component and a second component which remains fibrous so as to reinforce said foamed body.

3. A fiber-reinforced foamed material according to claim 2, wherein at least some of said composite reinforcement fibers are present in the form of a cloth formed from the composite fibrous material.

4. A fiber-reinforced foamed material according to claim 2, wherein said composite fibrous material is a core/sheath fiber.

5. A fiber-reinforced foamed material according to claim 2, wherein said composite fibrous material is a bimetal fiber.

6. A fiber-reinforced foamed material according to claims 2, wherein said composite fibrous material is a multi-layer bonding fiber.

7. A fiber-reinforced foamed material according to claims 2, wherein said composite fibrous material is a radial multi-layer bonding fiber.

8. A fiber-reinforced foamed material according to claim 4, wherein the fibers of the composite fibrous material are core/sheath composite fibers having a multiplicity of core elements in the sheath.

9. A fiber-reinforced foamed material according to claim 8, wherein at least two types of core elements are present in said sheath.

10. A fiber-reinforced foamed material according to claims 2, wherein said composite fibrous material comprises a composite yarn which is a mixed filament yarn composed of a plurality of yarn components.

11. A fiber-reinforced foamed material according to claims 2, wherein said composite fibrous material comprises a composite yarn which is a two-ply and twisted yarn composed of a plurality of yarn components.

12. A fiber-reinforced foamed material according to claims 2, wherein said first component of said composite fibrous material is a polymer having a thermal deformation temperature or a melting temperature which is at least 10° C. lower than the foam thermal deformation temperature or the melting temperature of said foamed body.

13. A fiber-reinforced foamed material according to claims 2, wherein said first component of said composite fibrous material is a polymer having a monomer unit also present in said foamed body.

14. A fiber-reinforced foamed material according to claim 13, wherein said first component of said composite fibrous material is a copolymer comprising the said monomer unit present in said foamed body and another monomer unit.

15. A fiber-reinforced foamed material according to claims 2, wherein said second component of said composite fibrous material is a polymer having a thermal deformation temperature or melting temperature whichis not lower than 160° C.

16. A fiber-reinforced foamed material according to claims 2, wherein said second component of said composite fibrous material is a polymer having a thermal deformation temperature or melting temperature which is at least 50° C. higher than the foam material deformation temperature or the melting temperature of said foamed body.

17. A fiber-reinforced foamed material according to claim 16, wherein said second component of said composite fibrous material is a polymer having a thermal deformation temperature or melting temperature which is at least 70° C. higher than the thermal deformation temperature or the melting temperature of said first component.

18. A fiber-reinforced foamed material according to any one of the preceding claims, wherein said foamed body is formed of a polymer having benzene rings.

19. A fiber-reinforced foamed material according to claim 18, wherein said foamed body is polystyrene.

20. A fiber-reinforced foamed material according to claim 18, wherein said foamed body is a phenol resin.

21. A fiber-reinforced foamed material comprising a foamed body of resin polymer having a flexural elasticity modulus not smaller than 150 kg/mm$^2$ and composite reinforcement fibers, said composite reinforcement fibers having a bonding component and a reinforcement component and are integrated with said foamed body to reinforce said foamed body, said bonding component having a melting point temperature at least 10° C. lower than a foam treatment temperature and said reinforcement component having a melting opint temperature 20° C. or higher than the foam treatment temperature.

* * * * *